(12) United States Patent
Wang

(10) Patent No.: US 11,846,715 B2
(45) Date of Patent: Dec. 19, 2023

(54) DGNSS USING REFERENCE STATION CARRIER PHASE MEASUREMENTS

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/411,705

(22) Filed: Aug. 25, 2021

(65) Prior Publication Data
US 2023/0062246 A1    Mar. 2, 2023

(51) Int. Cl.
*G01S 19/44*    (2010.01)
*G01S 19/41*    (2010.01)
*G01S 19/07*    (2010.01)
*G01S 19/04*    (2010.01)

(52) U.S. Cl.
CPC .............. *G01S 19/44* (2013.01); *G01S 19/41* (2013.01); *G01S 19/04* (2013.01); *G01S 19/071* (2019.08)

(58) Field of Classification Search
CPC ........ G01S 19/44; G01S 19/41; G01S 19/071; G01S 19/04
USPC ............ 342/357.25, 357.27, 357.32, 357.44, 342/357.68, 465
See application file for complete search history.

(56) References Cited

U.S. PATENT DOCUMENTS 7,570,204 B1 *    8/2009    McGraw .................. G01S 19/44
                                                              342/357.27

OTHER PUBLICATIONS

International Search Report and Written Opinion—PCT/US2022/073189—ISA/EPO—dated Nov. 7, 2022.
Mcgraw G. A., "Generalized Divergence-Free Carrier Smoothing with Applications to Dual Frequency Differential GPS", Proceedings of Ion NTM, XX, XX, Jan. 18, 2006, pp. 293-300, XP002461741.

* cited by examiner

*Primary Examiner* — Bo Fan
(74) *Attorney, Agent, or Firm* — QUALCOMM Incorporated

(57) ABSTRACT

Described are methods, systems, and devices for determining position using Differential Global Navigation Satellite (DGNSS) measurements. Techniques described herein involve taking carrier phase measurements at a reference station or other GNSS receiver at a known location, and combining the carrier phase measurements with pseudorange measurements taken at the reference station to resolve carrier phase ambiguity and to, in combination with pseudorange measurements taken at a mobile device, obtain a differentially corrected measurement that can be used to estimate a position of the mobile device. The differentially corrected measurement can be a double differential measurement based on signals from a pair of GNSS satellites.

28 Claims, 8 Drawing Sheets

500

502 Determine a first set of measurements including pseudorange measurements of signals from a first GNSS satellite

504 Determine a second set of measurements including pseudorange measurements of signals from a second GNSS satellite

506 Obtain a differentially corrected measurement based on the first set of measurements, the second set of measurements, and carrier phase measurements performed at a reference station, where the carrier phase measurements include carrier phase measurements of the signals from the first GNSS satellite and carrier phase measurements of the signals from the second GNSS satellite

508 Use the differentially corrected measurement to determine a position of a GNSS receiver where the measurements in 502 and 504 were taken

FIG. 5

DGNSS USING REFERENCE STATION CARRIER PHASE MEASUREMENTS

BACKGROUND

1. Field of Invention

The present invention relates generally to the field of satellite-based positioning, and more specifically to Differential Global Navigation Satellite System (DGNSS) techniques for determining a position of a mobile device using measurements performed at the mobile device in combination with measurements performed at a reference station.

2. Description of Related Art

GNSS positioning involves estimating a position of a mobile receiver based on pseudorange measurements obtained using radio frequency signals from satellites, for example, satellites of the Global Positioning System (GPS). GNSS positioning is capable of estimating position with a high degree of accuracy (e.g., several centimeters), but is nevertheless subject to errors due to signal delay (e.g., delay due to propagation through the ionosphere or troposphere), attenuation, multi-path errors, noise, and other sources of error. When errors are present, the accuracy can be degraded substantially (e.g., to several meters). To augment GNSS positioning, DGNSS techniques are sometimes applied in which two receivers (e.g., a mobile device and a reference station) each perform a pseudorange measurement of a signal from the same satellite. By taking a difference between the two pseudorange measurements, certain types of errors can potentially be canceled out due to spatial correlation between errors observed by the first receiver and errors observed by the second receiver. However, pseudorange measurements are subject to noise and multipath error, so the errors observed by both receivers can be different enough that the accuracy of the resulting position estimate is still degraded.

Carrier phase measurements are another type of ranging measurement but are not used in traditional DGNSS. Although less susceptible to noise and multipath error, carrier phase measurements are ambiguous in that they are expressed as units of cycles of a carrier frequency, but the precise number of such cycles taken for a signal to travel from a transmitter to a receiver is unknown and cannot be determined with further processing of the carrier phase measurements.

BRIEF SUMMARY

Embodiments described herein below address these and other issues by providing a DGNSS system in which carrier phase measurements taken at a reference station and pseudorange measurements taken at a mobile device are combined to produce a differential measurement used to estimate a position of the mobile device, where the differential measurement has less error than the raw measurements on which the differential measurement is based. To generate the differential measurement, raw measurements taken at the reference station can be processed in various ways including, among other things, determining linear combinations of carrier phase measurements and determining a difference between the linear combinations. Generating the differential measurement can also involve linear combinations of pseudorange measurements, including pseudorange measurements taken at the reference station. To resolve ambiguity in carrier phase, differential measurements can be performed for a pair of GNSS satellites and combined to determine a differential between the satellites. Ambiguity resolution may further involve using information about satellite fractional bias or a moving window average to determine a value of the ambiguity, thereby disambiguating the carrier phase measurements or measurements derived therefrom.

In certain aspects, a method of determining position using DGNSS measurements is performed at a mobile device and involves determining a first set of measurements including pseudorange measurements of signals from a first GNSS satellite. The method further involves determining a second set of measurements including pseudorange measurements of signals from a second GNSS satellite. The method further involves determining a position of the mobile device based on the first set of measurements, the second set of measurements, and carrier phase measurements performed at a reference station. The carrier phase measurements include carrier phase measurements of the signals from the first GNSS satellite and carrier phase measurements of the signals from the second GNSS satellite.

In certain aspects, a mobile device includes a GNSS receiver configured to receive signals from a first GNSS satellite and signals from a second GNSS satellite. The mobile device further includes a memory and one or more processing units communicatively coupled with the GNSS receiver and the memory. The one or more processing units are configured to determine a first set of measurements including pseudorange measurements of the signals from the first GNSS satellite, and to determine a second set of measurements including pseudorange measurements of the signals from the second GNSS satellite. The one or more processing units are further configured to determine a position of the mobile device based on the first set of measurements, the second set of measurements, and carrier phase measurements performed at a reference station. The carrier phase measurements include carrier phase measurements of the signals from the first GNSS satellite and carrier phase measurements of the signals from the second GNSS satellite.

According to certain aspects, a non-transitory computer-readable medium may have instructions stored thereon. When executed by one or more processing units, the instructions cause the one or more processing units to perform any of the methods described herein, including the above-described method of determining a position of a mobile device based on a first set of measurements, a second set of measurements, and carrier phase measurements performed at a reference station.

BRIEF DESCRIPTION OF THE DRAWINGS

FIG. 5 is a flow chart illustrating a method of determining a position of a mobile device using a differentially corrected measurement, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented are described below, other embodiments may be used, and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. RF signals transmitted by a GNSS satellite are referred to as "GSNSS signals." In some instances, an RF signal may be referred to herein simply as a "signal."

Additionally, as used herein, the term "correction data" may refer to corrective information provided by a Differential GNSS (DGNSS) system provided to enable a high-accuracy position determination of a device having a GNSS receiver. Correction data can include measurement data taken by a reference station (e.g., carrier phase and/or pseudorange measurements, which may be raw measurements or processed measurements) and/or corrective information derived from the measurement data, such as a difference between a true range determination, based on a known location of a reference station, and a measurement taken at the reference station. Correction data can be used as described herein, along with measurements taken at the device having the GNSS receiver, to determine the position of the device with a high level of accuracy.

Figure 1:
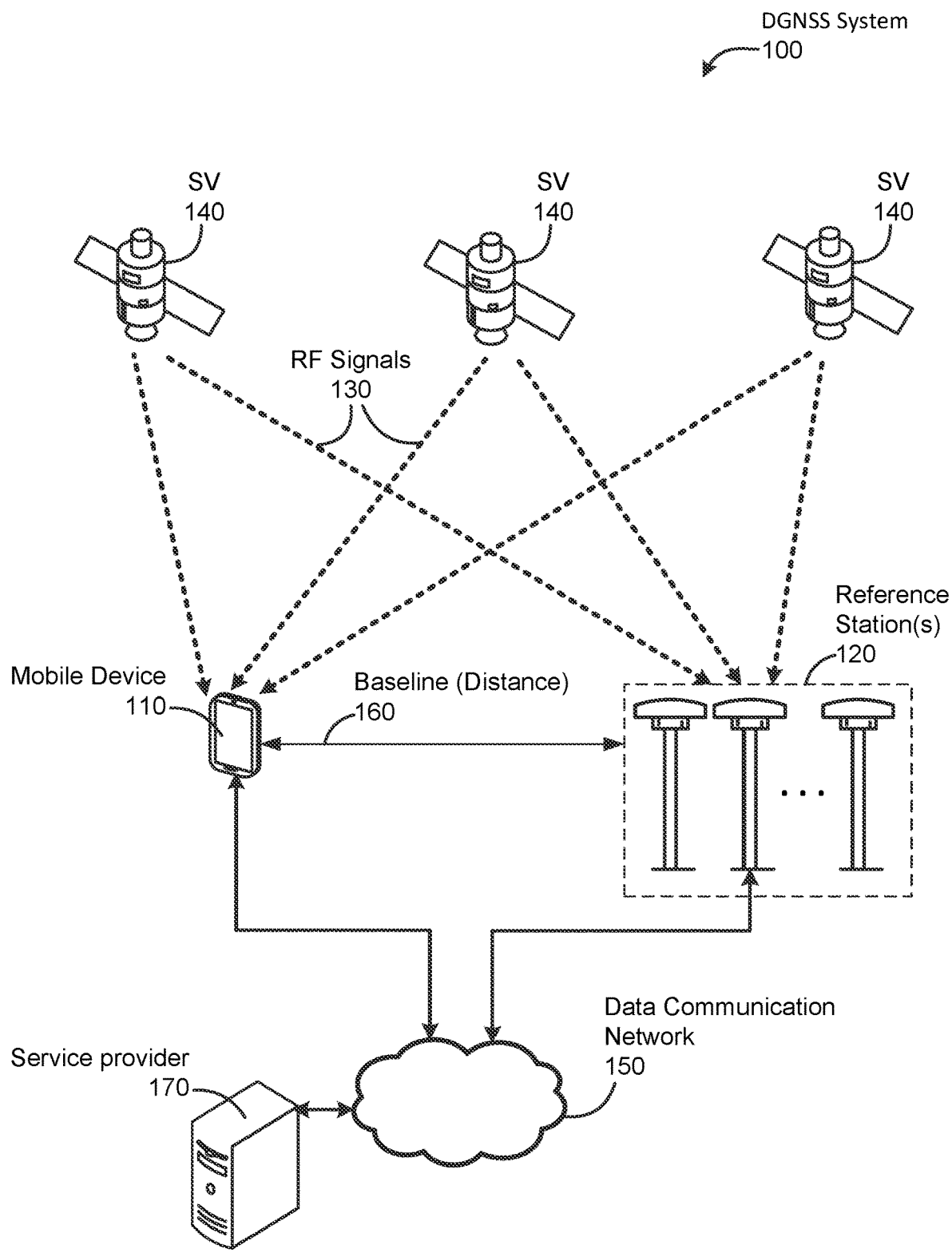
FIG. 1 is simplified diagram of a DGNSS system, according to an embodiment.

FIG. 1 is a simplified diagram of a DGNSS system 100, according to an embodiment. The DGNSS system 100 enables a highly accurate (e.g., sub-meter) GNSS position fix of a mobile device 110 (also known as a "rover station" or "rover") by using GNSS receivers at both the mobile device 110 and one or more reference stations 120 (also known as "base stations") that receive RF signals 130 from satellite vehicles (SVs) 140 (GNSS satellites) from one or more GNSS constellations (e.g., Global Position System (GPS), Galileo (GAL), global navigation Satellite System (GLONASS), Beidou, etc.). Types of mobile devices 110 used may vary, depending on application, and may include any of a variety of types of devices having access to GNSS positioning data, such as mobile devices equipped with GNSS receivers. Such mobile devices may include, for example consumer electronics or other mobile consumer devices, such as a mobile phone, tablet, laptop, wearable device, vehicle, or the like. In some embodiments, the mobile device 110 may comprise industrial equipment, such as survey equipment.

In GNSS-based positioning, the mobile device 110 can use code-based positioning to estimate a distance of each of the SVs 140 based on a determined delay in a generated pseudorandom binary sequence received in the RF signals 130. The mobile device 110 can further accurately calculate the location of each SV 140 at a specific moment in time using ephemeris (or navigation) data regarding the SVs 140. With the distance and location information of the SVs 140, the mobile device 110 can then determine a position fix for its location using traditional GNSS techniques. This position fix may be determined, for example, by a Standalone Positioning Engine (SPE) executed by one or more processors of the mobile device 110. However, the resulting accuracy of the position fix for mobile device 110 is subject to errors caused by SV 140 orbit and clock, ionosphere and troposphere delays, and other phenomena. Although this can provide accuracy on the order of meters, this accuracy may be insufficient for many applications.

DGNSS provides an enhancement to traditional GNSS positioning by providing correction data from a reference station 120 with a known, fixed location. More specifically, a reference station 120 uses a highly-accurate GNSS receiver to take GNSS measurements of RF signals 130, which is provided to the mobile device 110 (e.g., via radio broadcast and/or a data communication network 150, such as the Internet) along with the known location of the reference station 120. The mobile device can then use the correction data (which can include measurement data and location information of the reference station 120) to enhance GNSS-based positioning by making corrections to the measured distances (pseudoranges) to each of the SVs 140. This more accurate position fix may be determined, for example, by a positioning engine executed by one or more processors of the mobile device 110.

The correction data can be communicated to the mobile device in various ways, including through a radio broadcast from a reference station 120 or through messages communicated by wireline or wireless networks (e.g., data communication network 150) that couple a service provider 170 to the mobile device 110. Such networks may include any of a variety of public and/or private networks, such as the Internet, one or more mobile carrier networks, and/or other such Wide Area Networks (WANs). In network-based DGNSS, correction data from a plurality of reference stations 120 is sent to a service provider (e.g., service provider 170). The mobile device 110 can then receive the correction data by sending a request to the service provider 170. The request may include an approximate location of the mobile device 110, e.g., based on a previously-known position, non-GNSS-based positioning (such as a tracking area in a wireless communications network or dead reckoning-based positioning of a vehicle), etc. In response to the request, the service provider 170, which may include one or more computer servers, can send the correction data and/or GNSS service data for the approximate location of the mobile device 110.

In some implementations, the DGNSS system 100 is additionally configured to support RTK positioning, which can provide a more accurate solution (e.g., on the order of centimeters or decimeters) than GNSS-based positioning alone or GNSS-based positioning augmented using traditional DGNSS techniques. Similar to DGNSS, RTK positioning can use a reference station 120 to make measurements of RF signals 130 with a highly-accurate GNSS receiver at a known location. Unlike traditional DGNSS, RTK positioning uses pseudorange and carrier phase measurements, both of which are performed at the reference station 120 and at the mobile device 110. However, due to the relative complexity in implementing a positioning engine that can support RTK positioning as a result of it being more difficult to perform carrier phase measurements for a moving receiver, it is not always feasible to configure a mobile device to perform RTK-based positioning. Accordingly, various implementations described herein are directed to improved DGNSS techniques that involve carrier phase measurements performed on the reference station side but which, unlike RTK-based positioning, do not require carrier phase measurements to be performed at the mobile device/rover.

The mobile device 110 can use the correction data that it receives to correct errors in measurements of the RF signals 130 from its own GNSS receiver. Error correction can include correction of satellite clock and orbit, ionospheric and tropospheric delays, phase wind-up, site displacement including solid earth tide, ocean loading, and/or pole tide. This more accurate position fix (i.e., position) may be determined, for example, by a positioning engine executed by one or more processors of the mobile device 110. In some implementations, the mobile device 110 may include a Standalone Positioning Engine (SPE) configured to determine a position fix using traditional GNSS techniques and a separate a Precise Positioning Engine (PPE) configured to correct the position fix of the SPE using correction data generated according to the improved DGNSS techniques described herein. Alternatively, the functionality of the SPE and PPE may be combined into a single positioning engine executed by one or more processors of the mobile device 110. An SPE or PPE may, in some instances, be integrated into a GNSS receiver of the mobile device 110.

The positioning engine or PPE of the mobile device 110 can determine position using differential correction and estimation techniques such as by using an Extended Kalman Filter (EKF), Weighted Least Squares (WLS), a particle filter, or the like. In some implementations, the positioning engine or PPE of the mobile device 110 may be configured to resolve ambiguity in a carrier phase measurement performed by a reference station 120. However, as described below, ambiguity resolution can instead be performed at the reference station prior to communicating correction data to the mobile device. The accuracy of the position fix for the mobile device 110 can depend on its distance, or "baseline" 160, from the reference station 120; the accuracy of the differential corrections; and the like. To determine position, the positioning engine or PPE may use the correction data that the mobile device 110 receives in order to resolve the length of the baseline 160 and determine a corresponding baseline vector between the mobile device and a respective reference station. Details of differential correction using carrier phase measurements performed at a reference station are described below.

Figure 2:
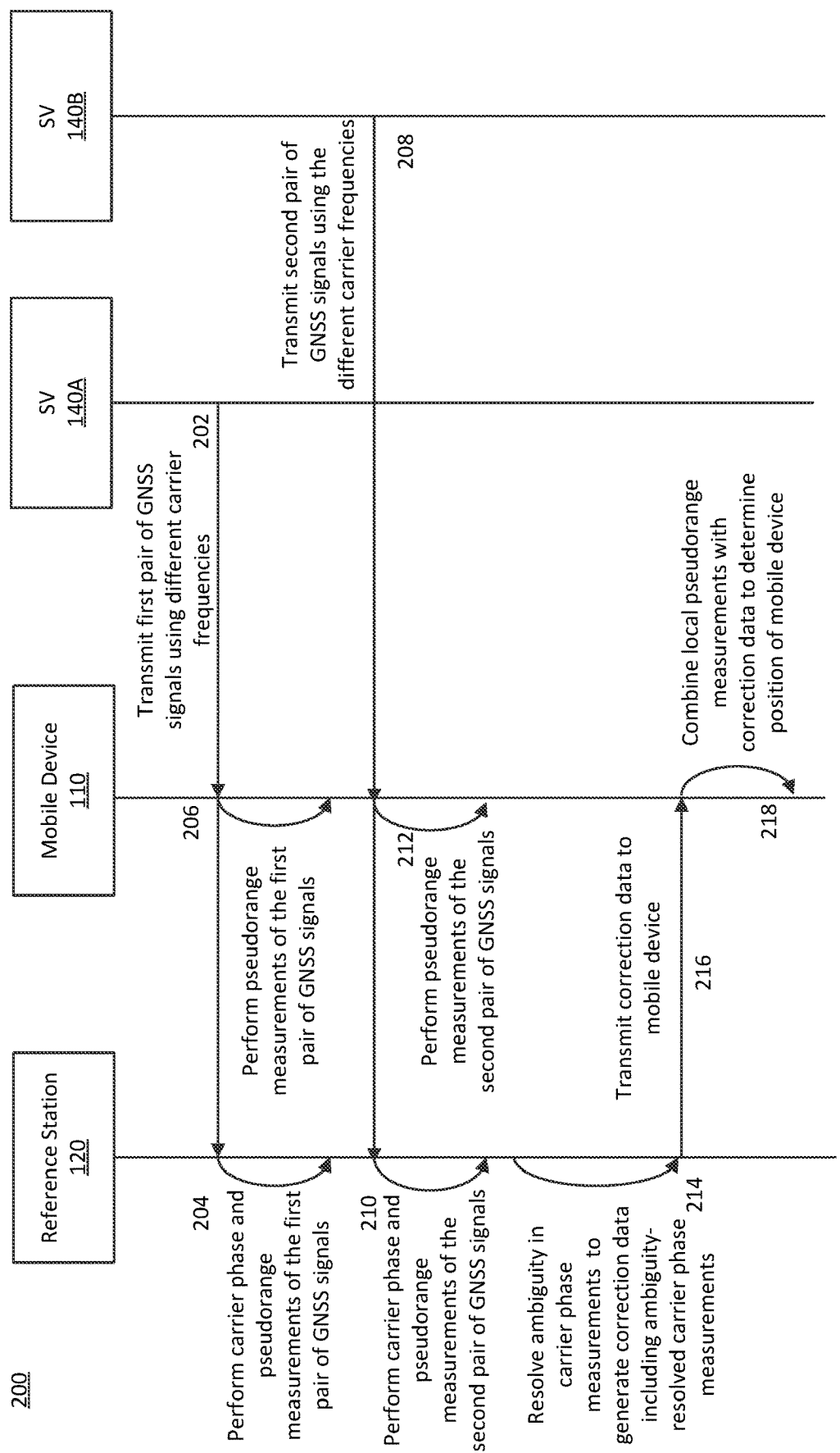
FIG. 2 is a flow diagram illustrating a process for performing DGNSS measurements, according to an embodiment.

FIG. 2 is flow diagram illustrating a process 200 for performing DGNSS measurements, according to an embodiment. The process 200 involves functionality performed by a reference station 120, mobile device 110, and two GNSS satellites (SV 140A and SV 140B), each of which are described above in connection with FIG. 1. The example of FIG. 2 is provided to illustrate that differential correction can be performed based on differences between measurements of RF signals transmitted by a pair of satellites. Although only two satellites are shown, it will be understood that the functionality depicted in FIG. 2 may be repeated in connection with other satellites of a GNSS constellation (e.g., to perform differential measurements between SV 140A and a third SV, between SV 140B and the third SV, between the third SV and a fourth SV, etc.) and possibly additional reference stations 120, in order to determine a number of positioning measurements sufficient for estimating the position of the mobile device 110 geometrically (e.g., using multiangulation and/or multilateration) and based on distance and/or angle measurements, along with the known position of one or more components such as reference stations 120.

As described below, differential (single difference) measurements can be subtracted to form a double difference measurement that includes a differentially corrected measurement such as a double-difference geometric range. A double difference can be a difference of a between-satellite single difference (e.g., between SVs 140A and 140B) and a between-receiver single difference (e.g., between a reference station 120 and mobile device 110). Typically, the single differences used to form a double difference are of the same type. For example, a single difference pseudorange measurement at a first receiver and a single difference pseudorange measurement at a second receiver may be subtracted to form a double-difference pseudorange measurement. However, examples are described herein that involve a between-satellite carrier phase measurement taken at a reference station and a between-satellite pseudorange measurement taken at a mobile device. Further, the between-satellite measurements may correspond to differences between linear combinations of pseudorange or carrier phase measurements.

At 202, SV 140A transmits a first pair of GNSS signals using different carrier frequencies. For example, SV 140A may transmit a signal using the L1 frequency (1575.42 MHz) and another signal using the L5 frequency (1176 MHz), as part of dual-band transmission. For illustration purposes, the present disclosure refers to L1 and L5 frequencies in the various formulas and equations below. However, it will be understood that other frequencies (e.g., L2) may also be used. Accordingly, the techniques described herein are not limited to being used with L1 and L5 frequencies. The first pair of GNSS signals are transmitted concurrently and are typically broadcast at periodic intervals. In some instances, an SV may transmit on more than two frequencies concurrently.

At 204, reference station 120 receives the first pair of GNSS signals using its local GNSS receiver and performs carrier phase and pseudorange measurements on each signal in the first pair of GNSS signals. The pseudorange measurements can be denoted $P_{L1,Base}$ and $P_{L5,Base}$, in reference to L1 and L5 signals transmitted by an SV such as SV 140A. Similarly, the carrier phase measurements can be denoted $\Phi_{L1,Base}$ and $\Phi_{L5,Base}$.

Pseudorange is an estimate of the actual distance (geometric range) between a transmitter (e.g., an SV 140) and a receiver (e.g., reference station 120 or mobile device 110), using correlation between a pseudorandom binary sequence received in an RF signal, such the either of the GNSS signals received in 204, and a reference signal. The accuracy of a pseudorange estimate is affected by various factors such as ionospheric and tropospheric delays, clock bias, and the like. Because reference station 120 is in close proximity to the mobile device 110 (e.g., within 30 kilometers), the effects of certain types of errors such as ionospheric delay and tropospheric delay are similar for the same GNSS signal received by reference station 120 and mobile device 110. Accordingly, if the degree of error in a pseudorange estimate performed by the reference station 120 is determined (which is possible since the location of the reference station 120 is known), then a correction can be applied to a pseudorange measurement of the same GNSS signal by the mobile device 110. Pseudorange measurements are sometimes referred to as code pseudorange measurements to distinguish from carrier phase measurements of the distance between a transmitter and a receiver.

The pseudorange measurements can be expressed mathematically as follows:

$$P_{L1} = \rho + dT + ISTB_{L1} + Trop + \frac{dIono}{f_1^2} + \epsilon_{P_{L1}} \quad (1)$$

$$P_{L5} = \rho + dT + ISTB_{L5} + Trop + \frac{dIono}{f_5^2} + \epsilon_{P_{L5}} \quad (2)$$

where $\rho$ is geometric range, dT is the difference between the clocks of the receiver and transmitter (in this instance, SV 140A and reference station 120), ISTB is a position error vector to be estimated, Trop is tropospheric delay, dIono is ionospheric delay (more specifically, a residual ionospheric delay error after applying a model of the ionosphere to reduce such error), $f_1$ and $f_5$ are the carrier frequencies of the pair of signals from the SV, and $\epsilon$ represents noise and multipath error. From equations 1 and 2, it can be seen that each of the pseudorange measurements includes the true distance or geometric range between the reference station 120 and the SV 140A, plus various error terms associated with clock bias, ionospheric and troposheric error, noise, and multipath error.

Carrier phase measurements are another way to determine a measure of the distance between a transmitter and a receiver and are expressed in units of cycles of a carrier frequency of the RF signal transmitted. The number of cycles taken for the RF signal to travel from the transmitter to the receiver, and thus the geometric range between the transmitter and receiver, cannot be determined from a single carrier phase measurement alone. The number of cycles therefore corresponds to an ambiguity term in a carrier phase measurement. This ambiguity can be resolved through combining a carrier phase measurement with other carrier phase measurements (or, as discussed below, with a pseudorange measurement). Ambiguity resolution may involve using information about the transmitting satellite (e.g., satellite fractional bias) and/or using ambiguity resolution techniques such as moving window averaging. Accordingly, even if the mobile device 110 is not configured to support carrier phase measurements, the carrier phase measurements of the reference station 120 can, after being resolved, be used in combination with pseudorange measurements performed by the mobile device 110 to more accurately determine the position of the mobile device 110.

The carrier phase measurements can be expressed mathematically as follows:

$$\Phi_{L1} = \rho + dT + ISTB_{L1} + Trop - \quad (3)$$
$$\frac{dIono}{f_1^2} + \lambda_{L1}(N_{L1} + r_{L1} - s_{L1}) + \epsilon_{\Phi_{L1}}$$

$$\Phi_{L5} = \rho + dT + ISTB_{L5} + Trop - \quad (4)$$
$$\frac{dIono}{f_5^2} + \lambda_{L5}(N_{L5} + r_{L5} - s_{L5}) + \epsilon_{\Phi_{L5}}$$

The carrier phase measurements include components corresponding to those of the pseudorange measurements. In this instance, the sign of the of the ionospheric error is negative instead of positive as in equations 1 and 2. Hence, ionospheric error is generally referred to as ionospheric advance (not delay) in the context of carrier phase measurements. Additionally, the carrier phase measurements include, as error terms: an ambiguity term N, which is a value representing the number of cycles of the carrier frequency taken in traveling from the transmitter to the receiver, a receiver fractional bias term r representing error due to inaccuracy of a receiver clock (e.g., a clock of the reference station 120 or a clock of mobile device 110), and a satellite fractional bias term s representing error due to inaccuracy of a satellite clock (e.g., a clock of the SV 140A or a clock of the SV 140B). $\lambda_{L1}$ and $\lambda_{L5}$ are the wavelengths of the pair of signals from the SV.

At 206, the mobile device 110 receives the first pair of GNSS signals using its local GNSS receiver and performs pseudorange measurements ($P_{L1,Rover}$ and $P_{L5,Rover}$) of each signal in the first pair of GNSS signals. The measurements in 206 can be performed in a similar manner to the measurements performed by the reference station in 204. Unlike the reference station 120, the mobile device 110 may omit carrier phase measurements of the first pair of GNSS signals.

At 208, SV 140B transmits a second pair of GNSS signals using the same carrier frequencies as those used to transmit the first pair of GNSS signals in 202. For example, like the SV 140A, the SV 140B may transmit its signals using the L1 and L5 frequencies.

At 210, reference station 120 receives the second pair of GNSS signals using its local GNSS receiver and performs carrier phase and pseudorange measurements of each signal in the second pair of GNSS signals. Accordingly, the reference station 120 will have obtained a set of measurements [$P_{L1,Base}$, $P_{L5,Base}$, $\Phi_{L1,Base}$, and $\Phi_{L5,Base}$] for the first pair of GNSS signals and a similar set of measurements for the second pair of GNSS signals.

At 212, mobile device 110 receives the second pair of GNSS signals using its local GNSS receiver and performs pseudorange measurements of each signal in the first pair of GNSS signals. Unlike the reference station 120, the mobile device 110 may omit carrier phase measurements of the second pair of GNSS signals. Accordingly, the mobile device 110 will have obtained a set of measurements [$P_{L1,Rover}$ and $P_{L5,Rover}$] for the first pair of GNSS signals and a similar set of measurements for the second pair of GNSS signals.

At 214, reference station 120 revolves ambiguity in (i.e., disambiguates) the carrier phase measurements from 204 and 210 to generate correction data that includes ambiguity-resolved carrier phase measurements. The ambiguity can be resolved through combining the measurements performed by the reference station in 204 and 210 in various ways. In some implementations, the ambiguity resolution may involve a wide-lane (WL) combination of the carrier phase measurements ($\Phi_{L1,Base}$, and $\Phi_{L5,Base}$) for a given pair of GNSS signals and a narrow-lane (NL) combination of the pseudorange measurements ($P_{L1,Base}$ and $P_{L5,Base}$) for the same pair of GNSS signals.

The WL combination is a linear combination that can include a first term corresponding to a first one of the carrier phase measurements minus a second term corresponding to a second one of the carrier phase measurements, and can be expressed as:

$$\Phi_{WL-1-5} = \frac{f_1}{f_1 - f_5}\Phi_{L1} - \frac{f_5}{f_1 - f_5}\Phi_{L5} = \rho + dt + ISTB_{WL-1-5} + Trop + \frac{dIono}{f_1 f_5} + \lambda_{WL-1-5}(N_{WL-1-5} + r_{WL-1-5} - s_{WL-1-5}) + \epsilon_{\Phi_{WL-1-5}} \quad (5)$$

Similarly, the NL combination is a linear combination that can include a first term corresponding to a first one of the pseudorange measurements $P_{L1}$ plus a second term corresponding to a second one of the pseudorange measurements $P_{L5}$, and can be expressed as:

$$P_{NL-1-5} = \frac{f_1}{f_1 + f_5}P_{L1} + \frac{f_5}{f_1 + f_5}P_{L5} = \rho + dT + ISTB_{NL-1-5} + Trop + \frac{dIono}{f_1 f_5} + \epsilon_{P_{NL-1-5}} \quad (6)$$

In WL combinations, the combined wavelength is larger than any of the individual wavelengths that contribute to the combination. In NL combinations, the combined wavelength is shorter than any of the individual wavelengths that contribute to the combination. There are also combinations that can be classified as intermediate-lane combinations. In equations 5 and 6, the wavelengths of the NL combination and the WL combination are determined by frequency-dependent scale factors that are functions of the carrier frequencies $f_1$ and $f_5$. As indicated in equation 5, the denominators of the scale factors correspond to a difference of the carrier frequencies. The individual wavelengths that make up the WL combination are $$\frac{f_1}{f_1 - f_5} \text{ and } \frac{f_5}{f_1 - f_5}.$$

In equation 6, the denominators of the scale factors correspond to a sum of the carrier frequencies, with the individual wavelengths being $$\frac{f_1}{f_1 + f_5} \text{ and } \frac{f_5}{f_1 + f_5}.$$

The subscript notation indicating that the measurements are taken at the reference (base) station are omitted from equations 5 and 6 for simplicity.

To resolve the ambiguity in the carrier phase measurements from 204 and 210, more specifically, ambiguity represented in the WL combination of equation 5, the reference station 120 may first compute a difference between the NL combination and the WL combination, which can be expressed as:

$$(\Phi_{WL-1-5} - P_{NL-1-5}) = [ISTB_{WL-1-5} + \lambda_{WL-1-5}(N_{WL-1-5} + r_{WL-1-5} - s_{WL-1-5}) + \epsilon_{\Phi_{WL-1-5}}] - (ISTB_{NL-1-5} + \epsilon_{P_{NL-1-5}}) \quad (7)$$

As shown in equation 7, when the NL (pseudorange) combination is subtracted from the WL (carrier phase) combination, the terms that remain are the position error vectors ISTB and various error terms described above.

After computing the difference between the NL and WL combinations for each pair of signals, the reference station 120 may subtract these two differences to obtain a differential measurement representing a difference V between measurements of the signals from SV 140A (the first pair of GNSS signals) and corresponding measurements of the signals from SV 140B (the second pair of GNSS signals):

$$(\nabla \Phi_{WL-1-5} - \nabla P_{NL-1-5}) = [\lambda_{WL-1-5}(\nabla N_{WL-1-5} - \nabla s_{WL-1-5}) + \epsilon_{\Phi_{WL-1-5}}] - \epsilon_{P_{NL-1-5}} \quad (8)$$

As shown in equation 8, performing a differential measurement between two satellites, using the WL and NL combinations as described in equations 5 to 7, causes the position error vectors ISTB and the receiver fractional bias term r to drop out, leaving certain error terms, including the ambiguity term N, remaining.

Using the results of equation 8, the ambiguity can be resolved in various ways depending on whether information about satellite fractional basis $s_{WL}$ is known or not. For example, in some implementations, reference station 120 may receive a message from another reference station 120 or a network entity such as service provider 170, where the message contains the values of the fractional biases for SV 140A, with the fractional bias values for each signal in the corresponding pair of signals typically being different (e.g., $s_{WL-1} \neq s_{WL-5}$). Similarly, reference station 120 may receive a separate message containing the values of the fractional biases for SV 140B. The messages may be in a special format that does not conform to Radio Technical Commission for Maritime Services (RTCM) standards. For instance, the RTCM SC-104 standard defines a data structure for messages conveying differential correction data but does not specifically provide for communication of fractional bias.

Assuming that information about the values of the fractional biases for SVs 140A and 140B is available, reference station 120 may resolve the ambiguity for the two carrier phase measurements of a given pair of GNSS signals through a roundoff computation that fixes the difference between the ambiguities of the two carrier phase measurements to an integer value:

$$\nabla \hat{N}_{WL-1-5} = \text{Roundoff} \left( \frac{\sum_{k=1}^{n}(\nabla \Phi_{WL-1-5} - \nabla P_{NL-1-5} + \lambda_{WL-1-5}\nabla \hat{s}_{WL-1-5})}{n * \lambda_{WL-1-5}} \right) \quad (9)$$

The roundoff computation is performed for each SV over n sets of measurements and uses the value from equation 8 together with the values of the satellite fractional biases and information about the wavelengths of the GNSS signals.

Alternatively, another way to resolve the ambiguity is to apply a moving window average performed continuously over n sets of measurements:

$$\lambda_{WL-1-5}(\nabla \hat{N}_{WL-1-5} - \nabla \hat{s}_{WL-1-5}) = \frac{\sum_{k=1}^{n}(\nabla \Phi_{WL-1-5} - \nabla P_{NL-1-5})}{n} \quad (10)$$

The moving window average approach is comparatively slower than the approach of equation 9 but enables the ambiguity to be resolved to a non-integer value and does not depend on the availability of information about satellite fractional bias. Using either the roundoff approach or the moving window average approach, the reference station 120 can determine ambiguity-resolved carrier phase measurements for both SV 140A and SV 140B, which are then transmitted to the mobile device 110 in 216. Accordingly, ambiguity in a WL combination of carrier phase measurements taken at a receiver (e.g., reference station 120) can be resolved in various ways through processing performed on a difference between the WL combination and an NL combination of pseudorange measurements taken at the same receiver, where the difference between the WL combination and the NL combination is a between-satellite difference.

At 216, reference station 120 transmits the ambiguity-resolved carrier phase measurements (which can be in the form of a differential carrier phase measurement) as correction data to mobile device 110. The correction data transmitted to the mobile device can include other correction-related information besides the measurements themselves, for example, coordinates of the known location of the reference station 120.

At 218, mobile device 110 combines local pseudorange measurements (i.e., the measurements from 206 and 212) with the correction data transmitted in 216 to determine the position of the mobile device. In particular, the mobile device 110 can use the correction data to correct errors in the local pseudorange measurements and establish the mobile device's position with respect to the reference station 120 through traditional GNSS positioning techniques. In general, measurements of signals from at least four GNSS satellites are needed to establish a three-dimensional position fix (horizontal coordinates such as latitude and longitude, plus elevation) through GNSS positioning.

To correct its local pseudorange measurements, the mobile device can use the ambiguity-resolved carrier phase measurements from reference station 120 to perform a further differential measurement between the WL combination of carrier phase measurements in equation 5 (which have now been ambiguity-resolved) and an NL combination of local pseudorange measurements. After the ambiguity has been resolved, the difference between the WL combination for SV 140A and the WL combination for SV 140B becomes:

$$\nabla \Phi_{WL-1-5,base} = \nabla \rho_{base} + \nabla Trop_{base} + \frac{\nabla dIono_{base}}{f_1 f_5} + \epsilon_{\nabla \Phi_{WL-1-5,base}} \quad (11)$$

On the mobile device side, an NL combination of local pseudorange measurements can be determined in the same manner as set forth in equation 6 above. As with the NL combinations for the pseudorange measurements performed by reference station 120, a differential measurement between SV 140A and SV 140B can be performed based on a difference between NL combinations:

$$\nabla P_{NL-1-5,rover} = \nabla \rho_{rover} + \nabla Trop_{rover} + \frac{\nabla dIono_{rover}}{f_1 f_5} + \epsilon_{\nabla P_{NL-1-5,rover}} \quad (12)$$

Taking the difference between the differential WL combination in equation 11 and the differential NL combination in equation 12 produces a result that includes a double-difference geometric range term $\nabla \Delta \rho$ corresponding to a difference between the geometric range of the reference station 120 as measured using SV 140A and SV 140B and the geometric range of the mobile device 110 as measured using SV 140A and SV 140B:

$$\nabla P_{NL-1-5,rover} - \nabla \Phi_{WL-1-5,base} = \nabla \Delta \rho + (\epsilon_{\nabla P_{NL-1-5,rover}} - \epsilon_{\nabla \Phi_{WL-1-5,base}}) \quad (13)$$

Taking the difference between the differential WL combination and the differential NL combination effectively cancels out of the ionospheric and tropospheric error terms in equations 11 and 12 since the mobile device 110 and the reference station 120 can be expected to experience a similar degree of such error. For positioning purposes, the ionospheric and tropospheric errors can be assumed to be the same between the mobile device and the reference station. The remaining error terms (noise and multipath) in equation 13 can be canceled out through traditional methods. Accordingly, the measurement of equation 13 can be applied toward estimating the mobile device's position with a higher degree of accuracy compared to traditional DGNSS, since traditional DGNSS does not support the use of carrier phase measurements.

Figure 3:
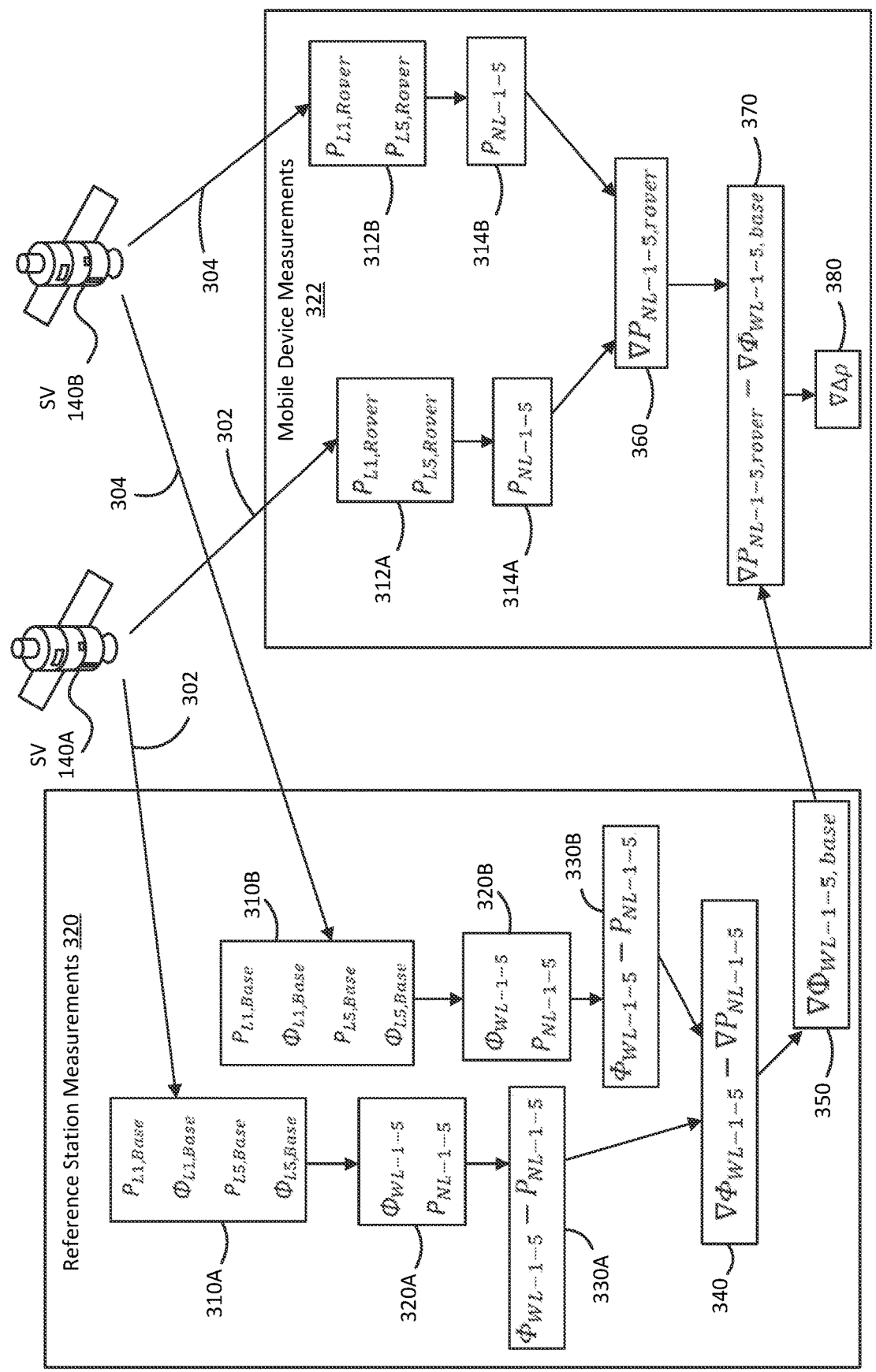
FIG. 3 illustrates different stages of measurements described in connection with FIG. 2.

FIG. 3 illustrates different stages of the measurements described above in connection with the example of FIG. 2. On the reference station side (e.g., at the reference station 120), reference station measurements 320 begin with a set 310A of pseudorange and carrier phase measurements using a pair of GNSS signals from SV 140A (e.g., the first pair of GNSS signals in 202) and a corresponding set 310B of pseudorange and carrier phase measurements using a pair of GNSS signals from SV 140B (e.g., the second pair of GNSS signals in 208). The measurements from set 310A are combined to form a set 320A of measurements corresponding to the WL (carrier phase) combination in equation 5 and the NL (pseudorange) combination in equation 6. Likewise, the measurements from set 310B are combined to form a set 320B including a WL combination and an NL combination.

A measurement 330A is then determined by subtracting the NL combination from the WL combination in set 320A (or vice versa). Likewise, a measurement 330B is determined by subtracting the NL combination from the WL combination in set 320B (or vice versa). A difference between the measurements 330A and 330B is then determined as a differential measurement 340 between SV 140A and SV 140B.

The differential measurement 340 can be used to resolve the ambiguity in the carrier phase measurements, for example, using information about satellite fractional bias or the moving window average approach described above. Resolving the ambiguity allows a carrier phase portion 350 of the differential measurement 340 to be generated for transmission to a mobile device (e.g., mobile device 110).

On the mobile device side, mobile device measurements 322 begin with a set 312A of pseudorange measurements analogous to the pseudorange measurements in set 310A and, similarly, a set 312B of pseudorange measurements analogous to the pseudorange measurements in set 310B. The mobile device uses the measurements in set 312A to form an NL pseudorange combination 314A analogous to the NL combination in set 320A. Likewise, the mobile device uses the measurements in set 312B to form an NL pseudorange combination 314B analogous to the NL combination in set 320B.

The mobile device then determines a difference between the NL combinations 314A and 314B as a differential pseudorange measurement 360 between SV 140A and SV 140B. The differential carrier phase measurement 350 from the reference station is then subtracted from the differential pseudorange measurement taken at the mobile device (or vice versa) to, as discussed above in connection with equation 13, produce a double-difference geometric range 380 that can be used to estimate the position of the mobile device.

The measurements performed by the mobile device do not have to occur simultaneously or overlap with the measurements performed by the reference station. For instance, the pseudorange measurements in 310A and 310B can be performed over a measurement period that is offset and non-overlapping (or partially overlapping) with a measurement period over which the pseudorange measurements in 312A and 312B are performed. The pseudorange measurements in 310A and 310B may, for example, be performed several seconds or minutes apart from the pseudorange measurements in 312A and 312B. Similarly, the measurements local to each receiver (the reference station or the mobile device) can be performed at different times so that the local measurements are partially or completely non-overlapping. For example, the carrier phase measurements in 310A could be a few seconds or minutes apart from the carrier phase measurements in 310B. Accordingly, measurements with respect to both satellites 140A and 140B (e.g., measurements across different receivers and/or measurements within the same receiver) can be performed to differentially determine the position of the mobile device even though the measurements are not necessarily performed simultaneously.

Figure 4:
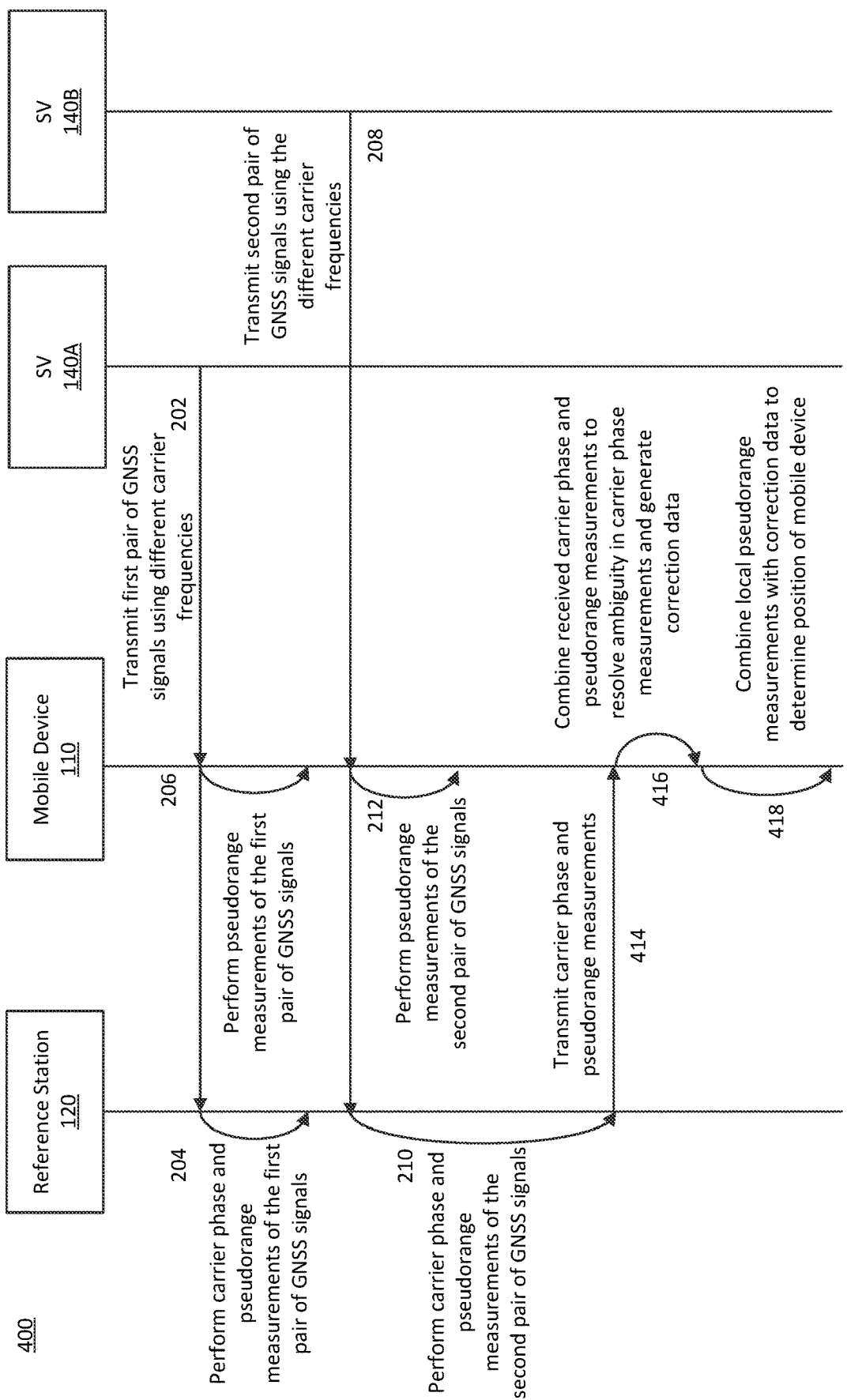
FIG. 4 is a flow diagram illustrating a process for performing DGNSS measurements, according to an embodiment.

FIG. 4 is flow diagram illustrating a process 400 for performing DGNSS measurements, according to an embodiment. The process 400 includes functionality corresponding to that of 202, 204, 206, 208, 210, and 212 in FIG. 2. The process 400 differs from the process 200 in that ambiguity resolution is performed by the mobile device 110 instead of the reference station 120. Instead of performing ambiguity resolution on the reference station side, the reference station 120 can transmit (at 414) its raw measurements (e.g., the carrier phase and pseudorange measurements in sets 320A and 320B shown in FIG. 3) to the mobile device 110.

At 416, the mobile device 110 combines the carrier phase and pseudorange measurements that were transmitted in 414 to resolve the ambiguity in the carrier phase measurements and generate its own correction data. The mobile device 110 can resolve ambiguity in the carrier phase measurements provided by reference station 120 (more specifically, ambiguity represented in a WL carrier phase combination) using the same techniques that the reference station 120 would have used. For example, the mobile device 110 may have access to information about the fractional biases of the SVs 140A and 140B, where the fractional bias information could be transmitted from another reference station 120, a network entity such as service provider 170 in FIG. 1, or possibly the same reference station 120 that transmitted the carrier phase and pseudorange measurements in 414. Alternatively, the mobile device 110 could perform a moving window average. To perform ambiguity resolution, the mobile device 110 may collect n sets of raw measurements from the reference station 120 over a period of time, which may not always be possible, for example, due to signal interference. However, assuming that the mobile device 110 can obtain a sufficient number of raw measurements, the mobile device 110 can resolve the ambiguity with the same level of accuracy as the reference station.

At 416, the mobile device 110 combines its local pseudorange measurements (e.g., the set 312A and the set 312B in FIG. 3) with the correction data generated in 416 to determine the position of the mobile device. The combining in 416 can be performed in the same manner described above in reference to FIG. 2 and may, for example, involve determining NL pseudorange combinations based on the local pseudorange measurements (e.g., the NL combinations 314A and 314B), determining a difference between the NL combinations as a differential pseudorange measurement, determining a difference between WL carrier phase combinations (e.g., the differential carrier phase measurement 350 but performed by the mobile device 110 instead of the reference station 120), and subtracting the differential carrier phase measurement from the differential pseudorange measurement (or vice versa) to determine a double-difference geometric range usable for estimating the mobile device's position.

Figure 6:
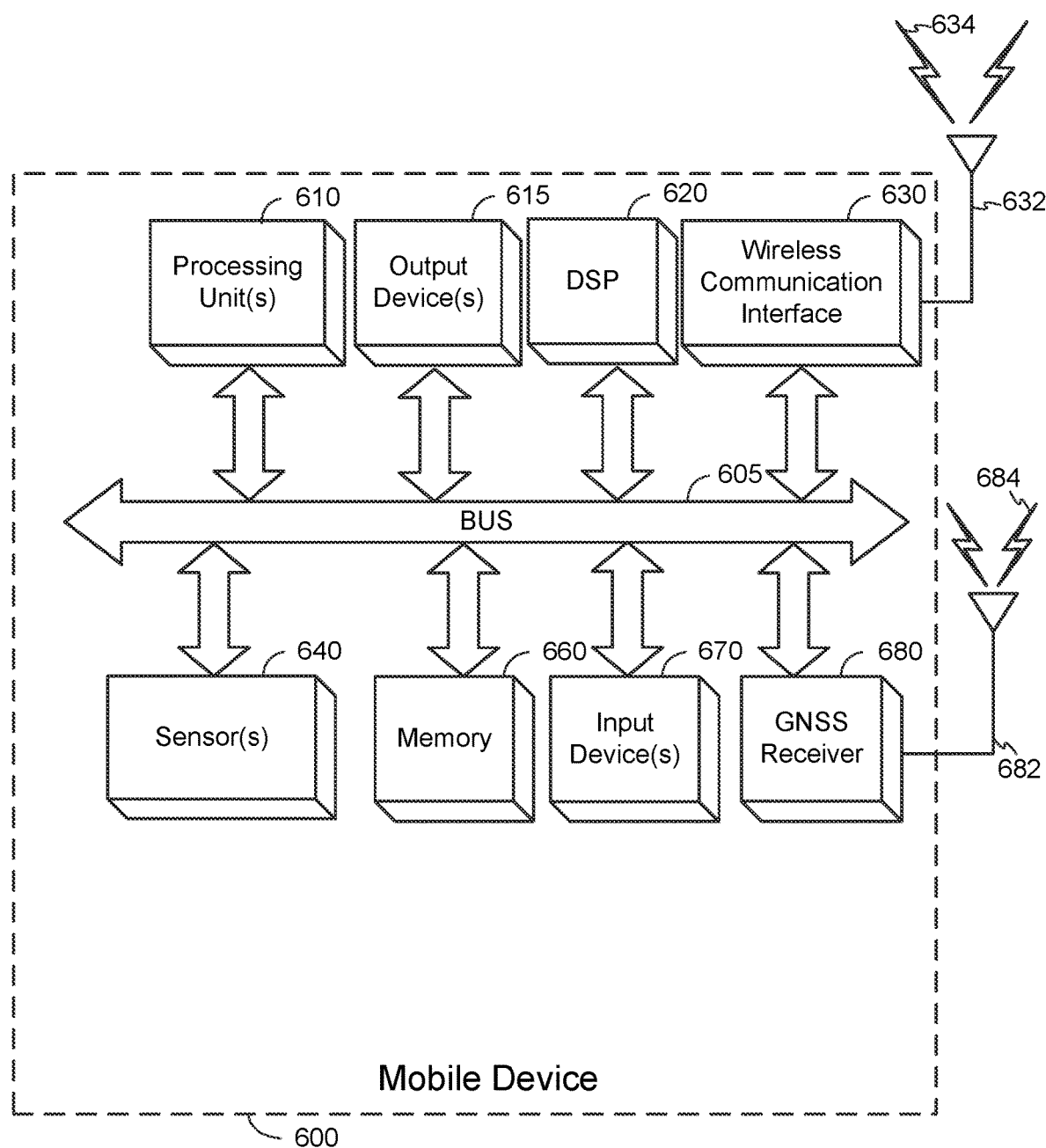
FIG. 6 is a block diagram of various hardware and software components of a mobile device, according to an embodiment.

FIG. 5 is a flow chart illustrating a method 500 of determining a position of a mobile device using a differentially corrected measurement, according to an embodiment. Means for performing the functionality illustrated in FIG. 5 may be performed by hardware and/or software components of a mobile device equipped with a GNSS receiver (e.g., mobile device 110). Example components of a mobile device are illustrated in FIG. 6, which is described in more detail below.

At 502, a first set of measurements including pseudorange measurements of signals from a first GNSS satellite is determined. The first set of measurements may, for example, correspond to the set 312A in FIG. 3 and can include pseudorange measurements of at least two RF signals transmitted by the first GNSS satellite. The first set of measurements can be determined using a GNSS receiver of the mobile device in conjunction with processing performed by one or more processing units of the mobile device, where the one or more processing units can include processing units internal to the GNSS receiver, processing units communicatively coupled to the GNSS receiver, or both.

At 504, a second set of measurements including pseudorange measurements of signals from a second GNSS satellite is determined. The second set of measurements may, for example, correspond to the set 312B and can include pseudorange measurements of at least two RF signals transmitted by the second GNSS satellite. The second set of measurements can be determined the same component(s) used for determining the first set of measurements in 502 (e.g., the same GNSS receiver).

At 506, a differentially corrected measurement is obtained based on the first set of measurements from 502, the second set of measurements from 504, and further based on carrier phase measurements performed at a reference station. For example, the carrier phase measurements may correspond to the carrier phase measurements in set 310A and set 310B, and the differentially corrected measurement may correspond to the double-difference geometric range value 380. The differentially corrected measurement is corrected in the sense that, when compared to the raw measurements taken at the mobile device (e.g., pseudorange), one or more types of errors (e.g., ionospheric delay, tropospheric delay, satellite clock bias, receiver clock bias, etc.) are not present or at least substantially reduced as a result of computing differences between corresponding measurements.

The differentially corrected measurement can be computed at the mobile device or at a remote entity that has access to the relevant measurements (e.g., at the reference station that performed the carrier phase measurements or at a server in communication with the reference station and the mobile device). For example, if the differentially corrected measurement is computed at the mobile device, the mobile device may receive the carrier phase measurements as raw measurements or, as described above in connection with the example of FIG. 2, in the form of a differential carrier phase measurement (e.g., differential carrier phase measurement 350) that has been ambiguity-resolved. To compute the differentially corrected measurement, the mobile device may use the techniques associated with the various equations above. As discussed above, local pseudorange measurements (e.g., the measurements in 502 and 504) can be combined with carrier phase measurements taken at a reference station (e.g., reference station 120) to determine the geometric range value 380. The combining of such measurements can include, for example, WL carrier phase combinations and NL pseudorange combinations. Other types of linear combinations may be used in some embodiments.

At 508, the differentially corrected measurement obtained in 506 is used to determine (estimate) a position of a GNSS receiver where the measurements in 502 and 504 were taken (i.e., the position of the mobile device). The position of the GNSS receiver can be estimated with respect to a known location (e.g., three-dimensional Cartesian coordinates) of the reference station and based on similar differentially corrected measurements obtained using other satellite pairings (e.g., between the first GNSS satellite and a third GNSS satellite, between the second GNSS satellite and the third GNSS satellite, between the third GNSS satellite and a fourth GNSS satellite etc.). In general, measurements from at least four GNSS satellites are used to form a linear system of equations that can be solved using traditional position estimation methods (e.g., Kalman filter or Least Squares) to estimate a position in three dimensions. Fewer GNSS satellites can be used depending on the desired positioning accuracy (e.g., when estimating position in two dimensions instead of three). In this manner, the position of the mobile device can be determined based on, among other things, the first set of measurements (from 502), the second set of measurements (from 504), and the carrier phase measurements from the reference station. The processing of the differentially corrected measurements may involve determining a baseline vector between the reference station and the mobile station. Since the location of the reference station is known, determining the baseline vector is tantamount to determining the position of the mobile device.

Accordingly, the functionality in blocks 502 to 506 can be repeated for at least two additional GNSS satellites in the same constellation as the first GNSS satellite and the second GNSS satellite (for a total of four or more satellites) to determine a set of differentially corrected measurements/observations (e.g., corrected pseudorange values representing distances between the mobile device and each of the four or more GNSS satellites, in the form of double-difference geometric ranges), thereby enabling the position of the mobile device to be estimated geometrically. The following explanation of how a double-difference geometric range measurement can be used to estimate the position of a mobile device is described with respect to a double difference based on single-difference pseudorange measurements, but also applies to estimating position using a double difference determined based on a single-difference pseudorange measurement and a single-difference, ambiguity-resolved carrier phase measurement such as described above with respect to equation 13.

The geometric range of a GNSS receiver is a function of the difference between each element in a vector (X, Y, Z) representing the position of the GNSS receiver and a corresponding element in a vector (x, y, z) representing the position of an SV:

$$\rho = \sqrt{(x-X)^2 + (y-Y)^2 + (z-Z)^2} \quad (14)$$

The geometric range of a mobile device (r) relative to an SV (i) can be represented as a first-order Taylor-linearized expression:

$$\rho_r^i = \sqrt{(x^i - \hat{X}_r)^2 + (y^i - \hat{Y}_r)^2 + (z^i - \hat{Z}_r)^2} + H X_r^i * dX_r + * dY_r + H Z_r^i * dZ_r = \hat{\rho}_r^i + (H_r^i)^* dXYZ$$

where $(\hat{X}, \hat{Y}, \hat{Z})$ is the approximate position of the mobile device, dXYZ is a vector representing unknown position offsets (dX, dY, dZ) of the mobile device, $\hat{\rho}_r^i$ is an approximate geometric range computed using the approximate position of the mobile device, and $H_r^i$ is a vector along the line of sight between the mobile device and the SV. Measured pseudorange can be expressed as the sum of equation 15 plus various error terms discussed above, including satellite clock bias, receiver clock bias, ionospheric delay, and tropospheric delay.

Computing a single difference based on a pseudorange measurement taken at the mobile device r and a pseudorange (or ambiguity-resolved carrier phase) measurement taken at a reference station (b) removes the satellite clock bias from each of the pseudorange measurements. Further, because the reference station and mobile device are close to each other, the ionospheric and tropospheric delays are essentially canceled out.

Computing a double difference (between satellites i and j and between receivers r and b) on top of the single difference measurement produces a measurement that can be expressed as a function of the position offset vector dXYZ to be estimated:

$$\Delta \nabla P_{b,r}^{i,j} = (P_r^j - P_b^j) - (P_r^i - P_b^i) = (\hat{\rho}_r^j - \rho_b^j) - (\hat{\rho}_r^i - \rho_b^i) + *H_r^j - H_r^i)^* dXYZ + \epsilon_{\nabla \Delta P_{b,r}^{i,j}} \quad (16)$$

When a total of n (greater than or equal to four) un-differenced measurements are observed at both receivers, n−1 double difference measurements according to equation 16 (which is analogous to equation 13 above) can be obtained to form a linear system of equations that can be processed, e.g., using a Kalman filter or Least Squares estimator, to solve for each element in the vector dXYZ. For example, three double difference measurements can be determined with respect to the same reference satellite $SV_{ref}$ and three additional SVs to form a system with three equations and three unknowns and solve for the position offset vector dXYZ, based on un-differenced measurements from four satellites in total.

FIG. 6 is a block diagram of various hardware and software components of a mobile device 600, according to an embodiment. These components can be utilized as described herein above (e.g. in association with FIGS. 1-5). For example, the mobile device 600 can perform the actions of the mobile device 110 illustrated in FIG. 1, the methods of FIGS. 2-5, and/or similar functions. It should be noted that FIG. 6 is meant only to provide a generalized illustration of various components, any or all of which may be utilized as appropriate. Mobile devices may vary in form and function, and may ultimately comprise any GNSS-enabled device, including vehicles, commercial and consumer electronic devices, survey equipment, and more. Thus, in some instances, components illustrated by FIG. 6 can be localized to a single physical device and/or distributed among various networked devices, which may be disposed at different physical locations (e.g., different locations of a vehicle).

The mobile device 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration units (GPUs), application specific integrated circuits (ASICs), and/or the like), and/or other processing structure or means. As shown in FIG. 6, some embodiments may have a separate Digital Signal Processor (DSP) 620, depending on desired functionality. Location determination and/or other determinations based on wireless communication may be provided in the processing unit(s) 610 and/or wireless communication interface 630 (discussed below). The mobile device 600 can also include one or more input devices 670, which can include without limitation a keyboard, touch screen, a touch pad, microphone, button(s), dial(s), switch(es), and/or the like; and one or more output devices 615, which can include without limitation a display, light emitting diode (LED), speakers, and/or the like. As will be appreciated, the type of input devices 670 and output devices 615 may depend on the type of mobile device with which the input devices 670 and output devices 615 are integrated.

The mobile device 600 may also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 600 to communicate via the networks described above with regard to FIG. 1. The wireless communication interface 630 may permit data and signaling to be communicated (e.g. transmitted and received) with a network, for example, via WAN access points, cellular reference stations and/or other access node types, and/or other network components, computer systems, and/or any other electronic devices described herein. The communication can be carried out via one or more wireless communication antenna(s) 632 that send and/or receive wireless signals 634. The antenna(s) 632 may comprise a one or more discrete antennas, one or more antenna arrays, or any combination.

Depending on desired functionality, the wireless communication interface 630 may comprise separate transceivers, a separate receiver and transmitter, or any combination of transceivers, transmitters, and/or receivers to communicate with reference stations and other terrestrial transceivers, such as wireless devices and access points. As previously noted, the mobile device 600 may communicate with different data networks that may comprise various network types, which can be achieved using the wireless communication interface 630. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, WCDMA, and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE™, LTE Advanced, 5G NR, and so on. 5G NR, LTE, LTE Advanced, GSM, and WCDMA are described in documents from the Third Generation Partnership Project (3GPP™) CDMA2000® is described in documents from a consortium named "3rd Generation Partnership Project 2" (3GPP2). 3GPP™ and 3GPP2 documents are publicly available. A WLAN may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The mobile device 600 can further include sensor(s) 640. Sensors 640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position fix of the mobile device 600, in some instances.

Embodiments of the mobile device 600 may also include a GNSS receiver 680 capable of receiving signals 684 from one or more GNSS satellites (e.g., SVs 140) using an antenna 682 (which could be the same as antenna 632). GNSS receiver 680 can take measurements described herein to determine a position fix for the mobile device 600, using signals 684 from GNSS SVs (e.g., SVs 140 of FIG. 1) of one or more GNSS constellations, and DGNSS-related data provided by a reference station and/or service provider (e.g., correction data, which can include measurements taken at the reference station and/or information derived from such measurements). The GNSS receiver 680 can perform the measurements of the signals 684 using internal processing units and/or in conjunction with processing performed by one or more processing units 610. Thus, a position fix can be determined by the GNSS receiver 680 itself or by a processing unit 610 based on output of the GNSS receiver 680. Measurements of the signals 684 can include raw measurements (e.g., uncorrected pseudorange) and/or processed measurements (e.g., differential pseudorange measurements, pseudorange combined with carrier phase, etc.).

GNSS receiver 680 can be used with various augmentation systems (e.g., SBAS) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The mobile device 600 may further include and/or be in communication with a memory 660. The memory 660 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the mobile device 600 can also comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the mobile device 600 (and/or processing components within mobile device 600 such as processing unit(s) 610 or DSP 620). In an aspect, then, such code and/or instructions can be used to configure and/or adapt a general purpose computer (or other device) to perform one or more operations in accordance with the described methods.

Figure 7:
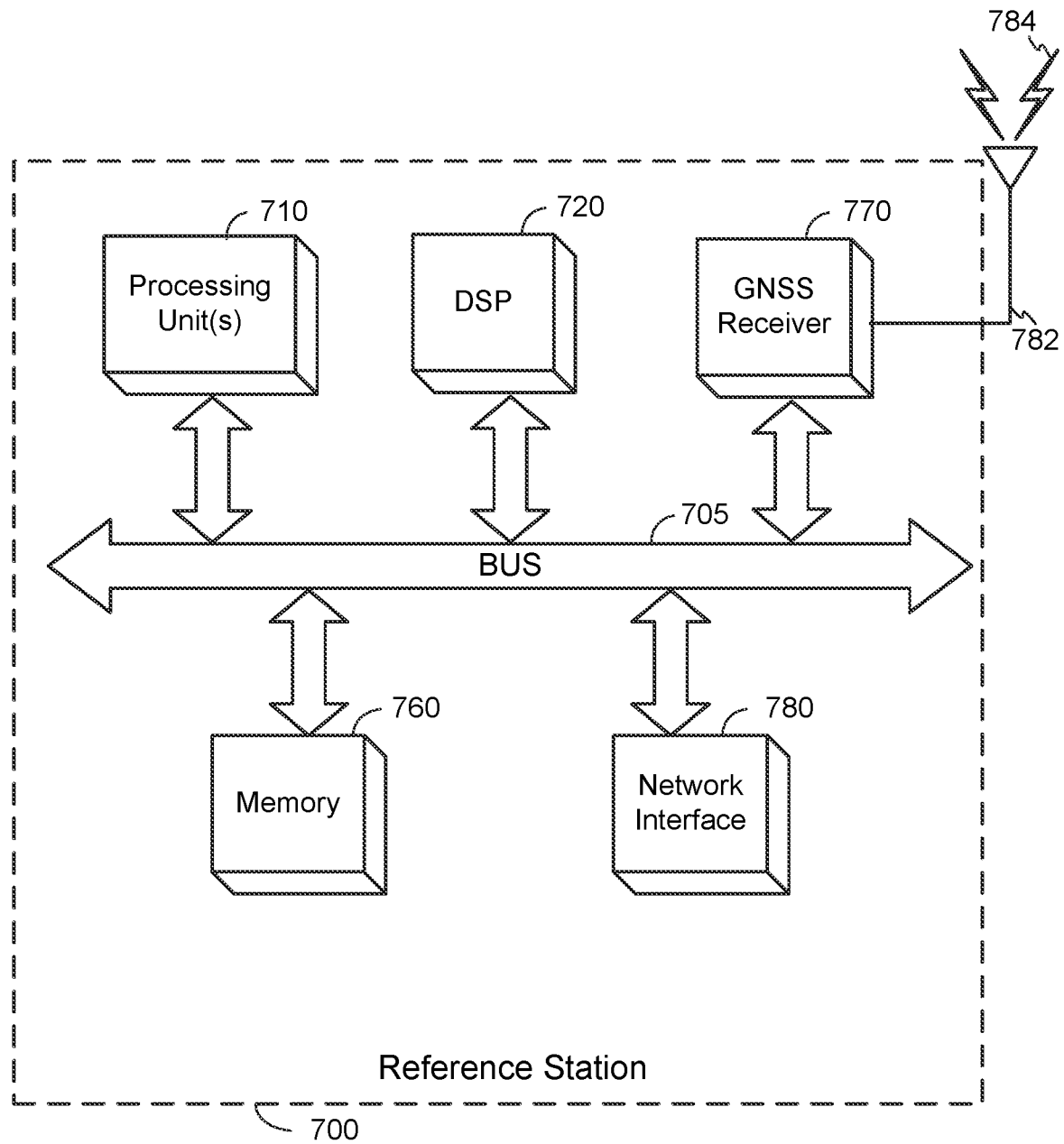
FIG. 7 is a block diagram of various hardware and software components of a reference station, according to an embodiment.

FIG. 7 is a block diagram of various hardware and software components of a reference station 700, according to an embodiment, which can be utilized as described herein above (e.g., in association with FIGS. 1-5). For example, the reference station 700 can perform the actions of the reference station 120 illustrated in FIG. 1, the methods of FIGS. 2-5, and/or similar functions. It should be noted that FIG. 7 is meant only to provide a generalized illustration of various components, any or all of which may be utilized as appropriate.

The reference station 700 is shown comprising hardware elements that can be electrically coupled via a bus 705 (or may otherwise be in communication, as appropriate). The hardware elements may include one or more processing unit(s) 710, which can include without limitation one or more general-purpose processors, one or more special-purpose processors (such as DSP chips, graphics acceleration processors, ASICs, and/or the like), and/or other processing structure or means. As shown in FIG. 7, some embodiments may have a separate DSP 720, depending on desired functionality. Location determination and/or other determinations based on wireless communication may be provided in the processing unit(s) 710 and/or wireless communication interface 730 (discussed below), according to some embodiments. The reference station 700 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The reference station 700 further comprises a GNSS receiver 770 capable taking measurements of signals 784 received using an antenna 782 from one or more GNSS satellites (e.g., SVs 140). The measurements of the signals 784 can include any of the types of signals described herein as capable of being performed by a reference station (e.g., reference station 120). For example, the measurements of the signals 784 can include raw measurements (e.g., uncorrected pseudorange measurements and/or carrier phase measurements (which may or may not be disambiguated)) and/or processed measurements (e.g., differential pseudorange, differential carrier phase, linear combinations of pseudorange, linear combinations of carrier phase, etc.).

The reference station 700 may be configured to provide the measurements of the signals 784 and/or information derived therefrom as correction data to a mobile device (e.g., mobile device 110). The correction data may further include other DGNSS-related data such as a known location of the reference station 700. The reference station 700 can communicate such correction data to the mobile device directly (e.g., using GNSS receiver 770) or through a network entity (e.g., a server of the service provider 170 in FIG. 1) using a network interface 780.

Network interface 780 can support wireline communication technologies. For instance, the network interface 780 may include a modem, network card, chipset, and/or the like. The network interface 780 may include one or more input and/or output communication interfaces to permit data to be exchanged with a network (e.g., the data communication network 150), communication network servers, computer systems, and/or any other electronic devices described herein. As such, this can include any of a variety of wireless technologies (e.g., such as those described with regard to the wireless communication interface 630 of FIG. 6), and/or wired technologies.

The reference station 700 can further comprise a memory 760. The memory 760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 760 of the reference station 700 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the reference station 700 (and/or processing components within reference station 700 such as processing unit(s) 710 or DSP 720). In an aspect, then, such code and/or instructions can be used to configure and/or adapt a general purpose computer (or other device) to perform one or more operations in accordance with the described methods.

Figure 8:
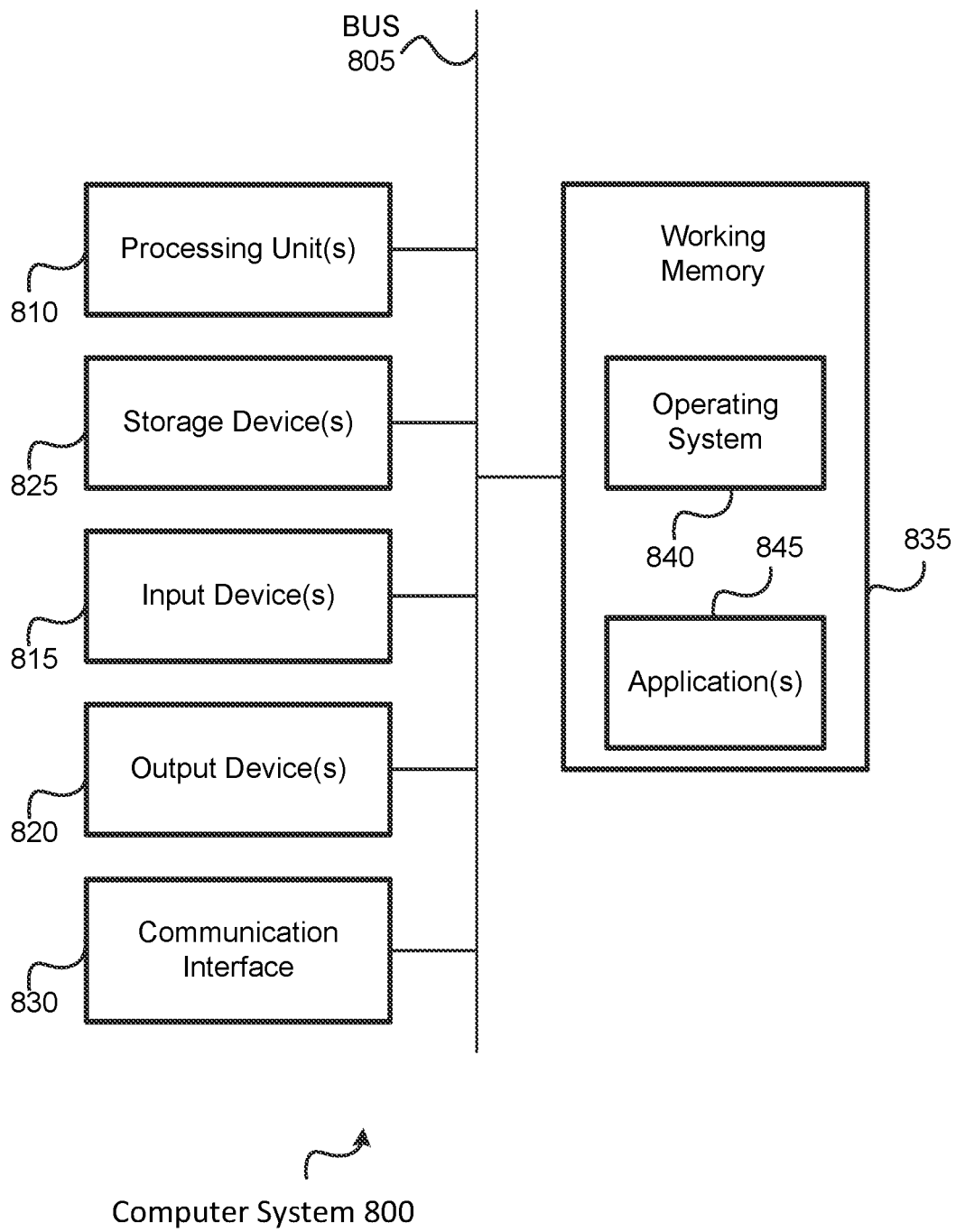
FIG. 8 is a block diagram of various hardware and software components of a computer system, according to an embodiment.

FIG. 8 is a block diagram of an embodiment of a computer system 800, which may be used, in whole or in part, to provide the functions of a server of the service provider 170 and/or other computer systems described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processing unit(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a random access memory (RAM), and/or a read-only memory (ROM), which can be programmable, flash-updateable, and/ or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 may also include a communication interface 830, which may comprise and software components configured to wireless or wired technologies. Wired technologies may include Ethernet, coaxial communications, universal serial bus (USB), and the like. The wireless communication may comprise 5G, LTE, and/or any of the other wireless technologies previously described (e.g., in relation to wireless communication interface 630 of FIG. 6). Thus the communications interface 830 may comprise a modem, a network card (wireless or wired), an infrared communication device, a wireless communication device, and/or a chipset, and/or the like, which may enable the computer system 800 to communicate on any or all of the communication networks described herein (e.g., data communication network 150) to any device on the respective network, including mobile device 110, reference station 120, other computer systems, and/or any other electronic devices described herein. Hence, the communications interface 830 may be used to receive and send data as described in the embodiments herein.

Computer system 800 can further comprise a working memory 835, which may comprise a RAM or ROM device. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "generating," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed at a mobile device of determining position using Differential Global Navigation Satellite (DGNSS) measurements, the method comprising: determining a first set of measurements including pseudorange measurements of signals from a first Global Navigation Satellite System (GNSS) satellite; determining a second set of measurements including pseudorange measurements of signals from a second GNSS satellite; and determining a position of the mobile device based on the first set of measurements, the second set of measurements, and carrier phase measurements performed at a reference station, wherein the carrier phase measurements include carrier phase measurements of the signals from the first GNSS satellite and carrier phase measurements of the signals from the second GNSS satellite.

Clause 2. The method of clause 1, wherein the signals from the first GNSS satellite include a first signal transmitted using a first carrier frequency and a second signal transmitted using a second carrier frequency, and wherein the signals from the second GNSS satellite include a third signal transmitted using the first carrier frequency and a fourth signal transmitted using the second carrier frequency.

Clause 3. The method of clause 1 or 2, wherein determining the position of the mobile device comprises determining a difference between a differential pseudorange measurement and a differential carrier phase measurement, wherein the differential pseudorange measurement is based on the first set of measurements and the second set of measurements, and wherein the differential carrier phase measurement is based on the carrier phase measurements performed at the reference station.

Clause 4. The method of clause 3, wherein the differential pseudorange measurement corresponds to a difference between a linear combination of measurements from the first set of measurements and a linear combination of measurements from the second set of measurements.

Clause 5. The method of clause 4, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

Clause 6. The method of any of clauses 3-5, wherein the differential carrier phase measurement is an ambiguity-resolved measurement for which a difference between a first value representing a number of carrier cycles between the reference station and the first GNSS satellite and a second value representing a number of carrier cycles between the reference station and the second GNSS satellite has been determined.

Clause 7. The method of any of clauses 3-6, further comprising: receiving the differential carrier phase measurement as correction data from the reference station.

Clause 8. The method of any of clauses 3-7, further comprising: receiving the carrier phase measurements performed at the reference station as raw measurements; and determining the differential carrier phase measurement from the raw measurements.

Clause 9. The method of any of clauses 3-8, wherein the differential carrier phase measurement corresponds to a difference between wide-lane combinations of the carrier phase measurements performed at the reference station, and wherein prior to determining the difference between the differential pseudorange measurement and the differential carrier phase measurement, ambiguity in the wide-lane combinations of the carrier phase measurements is resolved based on narrow-lane combinations of additional pseudorange measurements performed at the reference station.

Clause 10. The method of clause 9, wherein the ambiguity in the wide-lane combinations of the carrier phase measurements is resolved through: a moving window average based on a difference between: (i) the wide-lane combinations of the carrier phase measurements and (ii) the narrow-lane combinations of the additional pseudorange measurements; or a roundoff computation based on the difference between the wide-lane combinations of the carrier phase measurements and the narrow-lane combinations of the additional pseudorange measurements, and further based on information regarding fractional biases of the first GNSS satellite and the second GNSS satellite.

Clause 11. A mobile device comprising: a Global Navigation Satellite System (GNSS) receiver configured to receive signals from a first GNSS satellite and signals from a second GNSS satellite; a memory; and one or more processing units communicatively coupled with the GNSS receiver and the memory, the one or more processing units configured to: determine a first set of measurements including pseudorange measurements of the signals from the first GNSS satellite; determine a second set of measurements including pseudorange measurements of the signals from the second GNSS satellite; and determine a position of the mobile device based on the first set of measurements, the second set of measurements, and carrier phase measurements performed at a reference station, wherein the carrier phase measurements include carrier phase measurements of the signals from the first GNSS satellite and carrier phase measurements of the signals from the second GNSS satellite.

Clause 12. The mobile device of clause 11, wherein the signals from the first GNSS satellite include a first signal transmitted using a first carrier frequency and a second signal transmitted using a second carrier frequency, and wherein the signals from the second GNSS satellite include a third signal transmitted using the first carrier frequency and a fourth signal transmitted using the second carrier frequency.

Clause 13. The mobile device of clauses 11 or 12, wherein to determine the position of the mobile device, the one or more processing units are configured to determine a difference between a differential pseudorange measurement and a differential carrier phase measurement, wherein the differential pseudorange measurement is based on the first set of measurements and the second set of measurements, and wherein the differential carrier phase measurement is based on the carrier phase measurements performed at the reference station.

Clause 14. The mobile device of clause 13, wherein the differential pseudorange measurement corresponds to a difference between a linear combination of measurements from the first set of measurements and a linear combination of measurements from the second set of measurements.

Clause 15. The mobile device of clause 14, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

Clause 16. The mobile device of any of clauses 13-15, wherein the differential carrier phase measurement is an ambiguity-resolved measurement for which a difference between a first value representing a number of carrier cycles between the reference station and the first GNSS satellite and a second value representing a number of carrier cycles between the reference station and the second GNSS satellite has been determined.

Clause 17. The mobile device of any of clauses 13-16, wherein the mobile device is configured to receive the differential carrier phase measurement as correction data from the reference station.

Clause 18. The mobile device of any of clauses 13-17, wherein the mobile device is configured to receive the carrier phase measurements performed at the reference station as raw measurements, and wherein the one or more processing units are configured to determine the differential carrier phase measurement from the raw measurements.

Clause 19. The mobile device of any of clauses 13-18, wherein the differential carrier phase measurement corresponds to a difference between wide-lane combinations of the carrier phase measurements performed at the reference station, and wherein prior to the difference between the differential pseudorange measurement and the differential carrier phase measurement being determined, ambiguity in the wide-lane combinations of the carrier phase measurements is resolved based on narrow-lane combinations of additional pseudorange measurements performed at the reference station.

Clause 20. The mobile device of clause 19, wherein the ambiguity in the wide-lane combinations of the carrier phase measurements is resolved through: a moving window average based on a difference between: (i) the wide-lane combinations of the carrier phase measurements and (ii) the narrow-lane combinations of the additional pseudorange measurements; or a roundoff computation based on the difference between the wide-lane combinations of the carrier phase measurements and the narrow-lane combinations of the additional pseudorange measurements, and further based on information regarding fractional biases of the first GNSS satellite and the second GNSS satellite.

Clause 21. A non-transitory computer-readable medium having instructions stored thereon, wherein the instructions, when executed by one or more processing units of a mobile device, cause the one or more processing units to: determine a first set of measurements including pseudorange measurements of signals from a first Global Navigation Satellite System (GNSS) satellite; determine a second set of measurements including pseudorange measurements of signals from a second GNSS satellite; and determine a position of the mobile device based on the first set of measurements, the second set of measurements, and carrier phase measurements performed at a reference station, wherein the carrier phase measurements include carrier phase measurements of the signals from the first GNSS satellite and carrier phase measurements of the signals from the second GNSS satellite.

Clause 22. The non-transitory computer-readable medium of clause 21, wherein to determine the position of the mobile device, the instructions cause the one or more processing units to determine a difference between a differential pseudorange measurement and a differential carrier phase measurement, wherein the differential pseudorange measurement is based on the first set of measurements and the second set of measurements, and wherein the differential carrier phase measurement is based on the carrier phase measurements performed at the reference station.

Clause 23. The non-transitory computer-readable medium of clause 22, wherein the differential pseudorange measurement corresponds to a difference between a linear combination of measurements from the first set of measurements and a linear combination of measurements from the second set of measurements.

Clause 24. The non-transitory computer-readable medium of clause 23, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

Clause 25. The non-transitory computer-readable medium of any of clauses 22-24, wherein the differential carrier phase measurement corresponds to a difference between wide-lane combinations of the carrier phase measurements performed at the reference station, and wherein prior to the difference between the differential pseudorange measurement and the differential carrier phase measurement being determined, ambiguity in the wide-lane combinations of the carrier phase measurements is resolved based on narrow-lane combinations of additional pseudorange measurements performed at the reference station.

Clause 26. A system comprising: a Global Navigation Satellite System (GNSS) receiver configured to receive signals from a first GNSS satellite and signals from a second GNSS satellite; one or more processing units configured to: determine a first set of measurements including pseudorange measurements of the signals from the first GNSS satellite; and
determine a second set of measurements including pseudorange measurements of the signals from the second GNSS satellite; and means for determining a position of the GNSS receiver based on the first set of measurements, the second set of measurements, and carrier phase measurements performed at a reference station, wherein the carrier phase measurements include carrier phase measurements of the signals from the first GNSS satellite and carrier phase measurements of the signals from the second GNSS satellite.

Clause 27. The system of clause 26, wherein the means for determining the position of the GNSS receiver is configured to determine the position of the GNSS receiver based on a difference between a differential pseudorange measurement and a differential carrier phase measurement, wherein the differential pseudorange measurement is based on the first set of measurements and the second set of measurements, and wherein the differential carrier phase measurement is based on the carrier phase measurements performed at the reference station.

Clause 28. The system of clause 27, wherein the differential pseudorange measurement corresponds to a difference between a linear combination of measurements from the first set of measurements and a linear combination of measurements from the second set of measurements.

Clause 29. The system of clause 28, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station Clause 30. The system of any of clauses 27-29, wherein the differential carrier phase measurement corresponds to a difference between wide-lane combinations of the carrier phase measurements performed at the reference station, and wherein prior to the difference between the differential pseudorange measurement and the differential carrier phase measurement being determined, ambiguity in the wide-lane combinations of the carrier phase measurements is resolved based on narrow-lane combinations of additional pseudorange measurements performed at the reference station.

What is claimed is:

1. A method performed at a mobile device of determining position using Differential Global Navigation Satellite (DGNSS) measurements, the method comprising:
  determining a first set of measurements including pseudorange measurements of signals from a first Global Navigation Satellite System (GNSS) satellite;
  determining a second set of measurements including pseudorange measurements of signals from a second GNSS satellite; and
  determining a position of the mobile device based on the first set of measurements, the second set of measurements, and carrier phase measurements performed at a reference station, wherein:
    the carrier phase measurements include carrier phase measurements of the signals from the first GNSS satellite and carrier phase measurements of the signals from the second GNSS satellite,
    determining the position of the mobile device comprises determining a difference between a differential pseudorange measurement and a differential carrier phase measurement,
    the differential pseudorange measurement is based on the first set of measurements and the second set of measurements, and
    the differential carrier phase measurement is based on the carrier phase measurements.

2. The method of claim 1, wherein the signals from the first GNSS satellite include a first signal transmitted using a first carrier frequency and a second signal transmitted using a second carrier frequency, and wherein the signals from the second GNSS satellite include a third signal transmitted using the first carrier frequency and a fourth signal transmitted using the second carrier frequency.

3. The method of claim 1, wherein the differential pseudorange measurement corresponds to a difference between a linear combination of measurements from the first set of measurements and a linear combination of measurements from the second set of measurements.

4. The method of claim 3, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

5. The method of claim 1, wherein the differential carrier phase measurement is an ambiguity-resolved measurement for which a difference between a first value representing a number of carrier cycles between the reference station and the first GNSS satellite and a second value representing a number of carrier cycles between the reference station and the second GNSS satellite has been determined.

6. The method of claim 1, further comprising:
  receiving the differential carrier phase measurement as correction data from the reference station.

7. The method of claim 1, further comprising:
  receiving the carrier phase measurements performed at the reference station as raw measurements; and
  determining the differential carrier phase measurement from the raw measurements.

8. The method of claim 1, wherein the differential carrier phase measurement corresponds to a difference between wide-lane combinations of the carrier phase measurements performed at the reference station, and wherein prior to determining the difference between the differential pseudorange measurement and the differential carrier phase measurement, ambiguity in the wide-lane combinations of the carrier phase measurements is resolved based on narrow-lane combinations of additional pseudorange measurements performed at the reference station.

9. The method of claim 8, wherein the ambiguity in the wide-lane combinations of the carrier phase measurements is resolved through:
  a moving window average based on a difference between: (i) the wide-lane combinations of the carrier phase measurements and (ii) the narrow-lane combinations of the additional pseudorange measurements; or
  a roundoff computation based on the difference between the wide-lane combinations of the carrier phase measurements and the narrow-lane combinations of the additional pseudorange measurements, and further based on information regarding fractional biases of the first GNSS satellite and the second GNSS satellite.

10. A mobile device comprising:
  a Global Navigation Satellite System (GNSS) receiver configured to receive signals from a first GNSS satellite and signals from a second GNSS satellite;
  a memory; and one or more processing units communicatively coupled with the GNSS receiver and the memory, the one or more processing units configured to:
   determine a first set of measurements including pseudorange measurements of the signals from the first GNSS satellite;
   determine a second set of measurements including pseudorange measurements of the signals from the second GNSS satellite; and
   determine a position of the mobile device based on the first set of measurements, the second set of measurements, and carrier phase measurements performed at a reference station, wherein:
      the carrier phase measurements include carrier phase measurements of the signals from the first GNSS satellite and carrier phase measurements of the signals from the second GNSS satellite,
      to determine the position of the mobile device, the one or more processing units are configured to determine a difference between a differential pseudorange measurement and a differential carrier phase measurement,
      the differential pseudorange measurement is based on the first set of measurements and the second set of measurements, and
      the differential carrier phase measurement is based on the carrier phase measurements.

11. The mobile device of claim 10, wherein the signals from the first GNSS satellite include a first signal transmitted using a first carrier frequency and a second signal transmitted using a second carrier frequency, and wherein the signals from the second GNSS satellite include a third signal transmitted using the first carrier frequency and a fourth signal transmitted using the second carrier frequency.

12. The mobile device of claim 10, wherein the differential pseudorange measurement corresponds to a difference between a linear combination of measurements from the first set of measurements and a linear combination of measurements from the second set of measurements.

13. The mobile device of claim 12, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

14. The mobile device of claim 10, wherein the differential carrier phase measurement is an ambiguity-resolved measurement for which a difference between a first value representing a number of carrier cycles between the reference station and the first GNSS satellite and a second value representing a number of carrier cycles between the reference station and the second GNSS satellite has been determined.

15. The mobile device of claim 10, wherein the mobile device is configured to receive the differential carrier phase measurement as correction data from the reference station.

16. The mobile device of claim 10, wherein the mobile device is configured to receive the carrier phase measurements performed at the reference station as raw measurements, and wherein the one or more processing units are configured to determine the differential carrier phase measurement from the raw measurements.

17. The mobile device of claim 10, wherein the differential carrier phase measurement corresponds to a difference between wide-lane combinations of the carrier phase measurements performed at the reference station, and wherein prior to the difference between the differential pseudorange measurement and the differential carrier phase measurement being determined, ambiguity in the wide-lane combinations of the carrier phase measurements is resolved based on narrow-lane combinations of additional pseudorange measurements performed at the reference station.

18. The mobile device of claim 17, wherein the ambiguity in the wide-lane combinations of the carrier phase measurements is resolved through:
   a moving window average based on a difference between: (i) the wide-lane combinations of the carrier phase measurements and (ii) the narrow-lane combinations of the additional pseudorange measurements; or
   a roundoff computation based on the difference between the wide-lane combinations of the carrier phase measurements and the narrow-lane combinations of the additional pseudorange measurements, and further based on information regarding fractional biases of the first GNSS satellite and the second GNSS satellite.

19. A non-transitory computer-readable medium having instructions stored thereon, wherein the instructions, when executed by one or more processing units of a mobile device, cause the one or more processing units to:
   determine a first set of measurements including pseudorange measurements of signals from a first Global Navigation Satellite System (GNSS) satellite;
   determine a second set of measurements including pseudorange measurements of signals from a second GNSS satellite; and
   determine a position of the mobile device based on the first set of measurements, the second set of measurements, and carrier phase measurements performed at a reference station, wherein:
      the carrier phase measurements include carrier phase measurements of the signals from the first GNSS satellite and carrier phase measurements of the signals from the second GNSS satellite,
      to determine the position of the mobile device, the instructions cause the one or more processing units to determine a difference between a differential pseudorange measurement and a differential carrier phase measurement,
      the differential pseudorange measurement is based on the first set of measurements and the second set of measurements, and
      the differential carrier phase measurement is based on the carrier phase measurements.

20. The non-transitory computer-readable medium of claim 19, wherein the differential pseudorange measurement corresponds to a difference between a linear combination of measurements from the first set of measurements and a linear combination of measurements from the second set of measurements.

21. The non-transitory computer-readable medium of claim 20, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

22. The non-transitory computer-readable medium of claim 19, wherein the differential carrier phase measurement corresponds to a difference between wide-lane combinations of the carrier phase measurements performed at the reference station, and wherein prior to the difference between the differential pseudorange measurement and the differential carrier phase measurement being determined, ambiguity in the wide-lane combinations of the carrier phase measurements is resolved based on narrow-lane combinations of additional pseudorange measurements performed at the reference station.

23. A system comprising:
a Global Navigation Satellite System (GNSS) receiver configured to receive signals from a first GNSS satellite and signals from a second GNSS satellite;
one or more processing units configured to:
   determine a first set of measurements including pseudorange measurements of the signals from the first GNSS satellite; and
   determine a second set of measurements including pseudorange measurements of the signals from the second GNSS satellite; and
means for determining a position of the GNSS receiver based on the first set of measurements, the second set of measurements, and carrier phase measurements performed at a reference station, wherein:
   the carrier phase measurements include carrier phase measurements of the signals from the first GNSS satellite and carrier phase measurements of the signals from the second GNSS satellite,
   the means for determining the position of the GNSS receiver comprises means for determining a difference between a differential pseudorange measurement and a differential carrier phase measurement,
   the differential pseudorange measurement is based on the first set of measurements and the second set of measurements, and
   the differential carrier phase measurement is based on the carrier phase measurements.

24. The system of claim 23, wherein the differential pseudorange measurement corresponds to a difference between a linear combination of measurements from the first set of measurements and a linear combination of measurements from the second set of measurements.

25. The system of claim 24, wherein the linear combination of measurements from the first set of measurements and the linear combination of measurements from the second set of measurements are narrow-lane combinations, and wherein the differential carrier phase measurement is based on wide-lane combinations of the carrier phase measurements performed at the reference station.

26. The system of claim 23, wherein the differential carrier phase measurement corresponds to a difference between wide-lane combinations of the carrier phase measurements performed at the reference station, and wherein prior to the difference between the differential pseudorange measurement and the differential carrier phase measurement being determined, ambiguity in the wide-lane combinations of the carrier phase measurements is resolved based on narrow-lane combinations of additional pseudorange measurements performed at the reference station.

27. The system of claim 26, wherein the ambiguity in the wide-lane combinations of the carrier phase measurements is resolved through:
   a moving window average based on a difference between: (i) the wide-lane combinations of the carrier phase measurements and (ii) the narrow-lane combinations of the additional pseudorange measurements; or
   a roundoff computation based on the difference between the wide-lane combinations of the carrier phase measurements and the narrow-lane combinations of the additional pseudorange measurements, and further based on information regarding fractional biases of the first GNSS satellite and the second GNSS satellite.

28. The system of claim 23, wherein the differential carrier phase measurement is an ambiguity-resolved measurement for which a difference between a first value representing a number of carrier cycles between the reference station and the first GNSS satellite and a second value representing a number of carrier cycles between the reference station and the second GNSS satellite has been determined.

* * * * *